US006498856B1

(12) United States Patent
Itabashi et al.

(10) Patent No.: US 6,498,856 B1
(45) Date of Patent: Dec. 24, 2002

(54) VEHICLE-CARRIED SOUND REPRODUCTION APPARATUS

(75) Inventors: Tetsunori Itabashi, Kanagawa (JP); Junichi Usui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/566,529

(22) Filed: May 8, 2000

(30) Foreign Application Priority Data

May 10, 1999 (JP) .......................................... 11-128617
Sep. 17, 1999 (JP) .......................................... 11-263064

(51) Int. Cl.[7] ............................ H04R 5/00; H04R 5/02; H04B 1/00

(52) U.S. Cl. ............................ 381/302; 381/1; 381/17; 381/303; 381/86

(58) Field of Search ............................... 381/86, 1, 17, 381/302, 303, 61, 63

(56) References Cited

U.S. PATENT DOCUMENTS 4,199,658 A * 4/1980 Iwahara ...................... 381/303
5,333,200 A * 7/1994 Cooper et al. ................. 381/1
5,684,881 A * 11/1997 Serikawa et al. .............. 381/1
5,715,317 A * 2/1998 Nakazawa .................... 381/17
5,742,688 A * 4/1998 Ogawa et al. ................ 381/17
5,850,453 A * 12/1998 Klayman et al. .............. 381/1
5,883,961 A * 3/1999 House et al. .................. 381/1
5,982,903 A * 11/1999 Kinoshita et al. ............. 381/17
6,243,476 B1 * 6/2001 Gardner ......................... 381/1

* cited by examiner

*Primary Examiner*—Forester W. Isen
*Assistant Examiner*—Laura A. Grier
(74) *Attorney, Agent, or Firm*—Frommer Lawrence & Haug LLP; William S. Frommer

(57) ABSTRACT

A vehicle-carried sound reproduction system which reproduces a sound image forwardly of a passenger of a vehicle in which it is incorporated. The vehicle-carried sound reproduction apparatus includes a correction filter circuit for converting input digital audio signals XL(Z) and XR(Z) for left and right channels into digital audio signals YL(Z) and YR(Z) represented respectively by $$YL(Z)\cdot GLL(Z)+YR(Z)\cdot GLR(Z)=XL(Z)\cdot FLL(Z)+XR(Z)\cdot FLR(Z)$$

$$YR(Z)\cdot GLL(Z)+YL(Z)\cdot GLR(Z)=XR(Z)\cdot FLL(Z)+XL(Z)\cdot FLR(Z)$$

where FLL(Z), FLR(Z), GLL(Z), and GLR(Z) represent head transfer functions. The vehicle-carried sound reproduction system further includes a digital to analog converter circuit for converting the digital audio signals YL(Z) and YR(Z) outputted from the correction filter circuit into analog audio signals. The analog audio signals outputted from the digital to analog converter circuit are supplied to a pair of speakers for the left and right channels.

7 Claims, 9 Drawing Sheets

FORWARD ←

VEHICLE-CARRIED SOUND REPRODUCTION APPARATUS

BACKGROUND OF THE INVENTION

This invention relates to a vehicle-carried sound reproduction apparatus.

It is considered that, when a sound reproduction apparatus is used to reproduce music or the like, a sound image reproduced is ideally at the height of the eyes of the listener. Therefore, a speaker is usually disposed at the height of the eyes of a listener.

However, in a vehicle-carried sound reproduction apparatus, it is difficult to dispose a speaker at the height of the eyes of the listener who is a passenger such as the driver of the vehicle or a fellow passenger. Thus, a speaker is in most cases disposed at a lower portion ① of a front door or a lower portion ② of a rear door of a vehicle as shown in FIG. 9A. Accordingly, reproduced sound sounds from a low place, and a sound image is positioned below the eyes of the listener.

In order to avoid the disadvantage, an additional speaker having a comparatively small diameter for reproducing sound in a high frequency region is sometimes disposed at a position ③ forwardly of a listener as shown in FIG. 9A. However, where an additional speaker is disposed in this manner, sound in a high frequency region and sound in a low frequency region are outputted from different positions. Therefore, the sounds sound separately from each other to the listener.

It is known that sound has a nature that, as the frequency thereof increases, it becomes more likely to be absorbed. Accordingly, where a speaker is disposed at a comparatively low position in a vehicle chamber, sound in a high frequency region is absorbed by a seat or an interior member of the vehicle. Consequently, sound that the listener actually hears is different from reproduction sound outputted from the sound reproduction apparatus.

Further, as a countermeasure against such a situation as described above, it is effective to actually measure a transfer function in a vehicle chamber and correct reproduction sound in accordance with the transfer function. The countermeasure, however, requires a digital signal processing apparatus of a high performance. Since such a digital signal processing apparatus as just mentioned is considerably expensive, it is difficult to use it for sound reproduction apparatus for consumers.

Besides, there usually is a tendency that, if reproduction sound is corrected in accordance with a transfer function, then sound in a high frequency region is emphasized. Thus, when the sound volume level is raised, the sound provides an unfamiliar feeling to the listener.

SUMMARY OF THE INVENTION

It is an object of the present invention to provide a vehicle-carried sound reproduction apparatus such as a car audio apparatus which reproduces a sound image in front of a passenger on the vehicle.

In order to attain the object described above, according to an aspect of the present invention, there is provided a vehicle-carried sound reproduction apparatus, comprising: a correction filter circuit for converting input digital audio signals XL(Z) and XR(Z) for left and right channels into digital audio signals YL(Z) and YR(Z) represented, using head transfer functions, respectively by $$YL(Z)\cdot GLL(Z)+YR(Z)\cdot GLR(Z)=XL(Z)\cdot FLL(Z)+XR(Z)\cdot FLR(Z)$$

$$YR(Z)\cdot GLL(Z)+YL(Z)\cdot GLR(Z)=XR(Z)\cdot FLL(Z)+XL(Z)\cdot FLR(Z)$$

where, because the head transfer functions are leftwardly and rightwardly symmetrical with each other, the relationships of FLL(Z)=FRR(Z), FLR(Z)=FRL(Z), GLL(Z)=GRR(Z) and GLR(Z)=GRL(Z) are satisfied, and FLL(Z) is a head transfer function from a first speaker for the left channel positioned forwardly of a listener in a vehicle chamber to the left ear of the listener, FRR(Z) is a head transfer function from a first speaker for the right channel positioned forwardly of the listener to the right ear of the listener, FLR(Z) is a head transfer function from the first speaker for the left channel to the right ear of the listener, FRL(Z) is a head transfer function from the first speaker for the right channel to the left ear of the listener, GLL(Z) is a head transfer function from a second speaker for the left channel positioned at a lower position forwardly of the listener to the left ear of the listener, GRR(Z) is a head transfer function from a second speaker for the right channel positioned at a lower position forwardly of the listener to the right ear of the listener, GLR(Z) is a head transfer function from the second speaker for the left channel to the right ear of the listener, and GRL(Z) is a head transfer function from the second speaker for the right channel to the left ear of the listener; and a digital to analog converter circuit for converting the digital audio signals YL(Z) and YR(Z) outputted from the correction filter circuit into analog audio signals; the analog audio signals outputted from the digital to analog converter circuit being supplied to the second speakers for the left and right channels.

With the vehicle-carried sound reproduction apparatus, even if mounting positions of the speakers are limited, a sound image to be formed by the vehicle-carried sound reproduction apparatus can be positioned at the height of the eyes of the listener which is considered to be an ideal position. Accordingly, an imaginary speaker is disposed forwardly of the listener, and a sound field and a sound image are reproduced by the imaginary speaker. Further, the correction filter circuit has a simplified construction, and even where a digital signal processor (DSP) having a comparatively low processing capability is used for the correction filter circuit, an anticipated object can be achieved. Further, only if the transfer functions are measured, optimum correction can be performed with any model of a vehicle having any configuration.

Further, by averaging a plurality of transfer functions, a correction filter circuit which can be effectively used for a plurality of different models of vehicles can be produced. Accordingly, the correction filter circuit can be universally used as a correction filter circuit whose application is not limited to a specific model of a vehicle.

According to another aspect of the present invention, there is provided a vehicle-carried sound reproduction apparatus, comprising a pair of first signal lines along which a pair of digital audio signals for left and right channels are supplied, a pair of second signal lines along which the digital audio signals for the left and right channels are supplied, first and second delay circuits provided in the first signal lines for providing predetermined time delays to the digital audio signals for the left and right channels supplied along the first signal lines, third and fourth delay circuits provided in the second signal lines for providing predetermined time delays to the digital audio signals for the left and right channels supplied along the second signal lines, a pair of high frequency attenuation filters provided for the second signal lines for attenuating high frequency components of the digital audio signals for the left and right channels supplied along the second signal lines, fifth and sixth delay circuits provided for the second signal lines for providing time delays corresponding to a preceding sound effect to the digital audio signals for the left and right channels supplied along the second signal lines, a first digital to analog converter circuit for converting the digital audio signals for the left and right channels outputted from the first signal lines into analog audio signals, a second digital to analog converter circuit for converting the digital audio signals for the left and right channels outputted from the second signal lines into analog audio signals, a first pair of speakers disposed at left and right positions forwardly in a vehicle chamber for receiving the analog audio signals outputted from the first digital to analog converter circuit to reproduce sound, a second pair of speakers disposed at left and right positions rearwardly in the vehicle chamber for receiving the analog audio signals outputted from the second digital to analog converter circuit to reproduce sound, and means for controlling the delay times of the first to fourth delay circuits in response to a positional relationship between the first and second pairs of speakers and a listener.

With the vehicle-carried sound reproduction apparatus, the phases of reproduction sounds outputted from the speakers when they arrive at the listener can be adjusted by means of the first to fourth delay circuits, and accordingly, a sound image can be positioned definitely and a sound characteristic at a seated position of the listener is augmented.

Further, since high frequency components of reproduction sounds to be outputted from the second speakers are attenuated by the high frequency attenuation filters, the position of a sound image as perceived by the listener on a front seat is prevented from being displaced rearwardly, and a sound image can be positioned definitely also in this regard.

Furthermore, since the fifth and sixth delay circuits provide time delays corresponding to a preceding sound effect to the digital audio signals for the left and right channels supplied along the second signal lines, reproduction sounds outputted from the first speakers at the forward positions precede reproduction sounds outputted from the second speakers at the rearward positions relatively by approximately 10 msec to 20 msec. Consequently, the reproduction sounds outputted from the first speakers at the front positions are emphasized, and accordingly, a sound image can be positioned forwardly The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Outline of the Vehicle-Carried Sound Reproduction Apparatus

Figure 1:
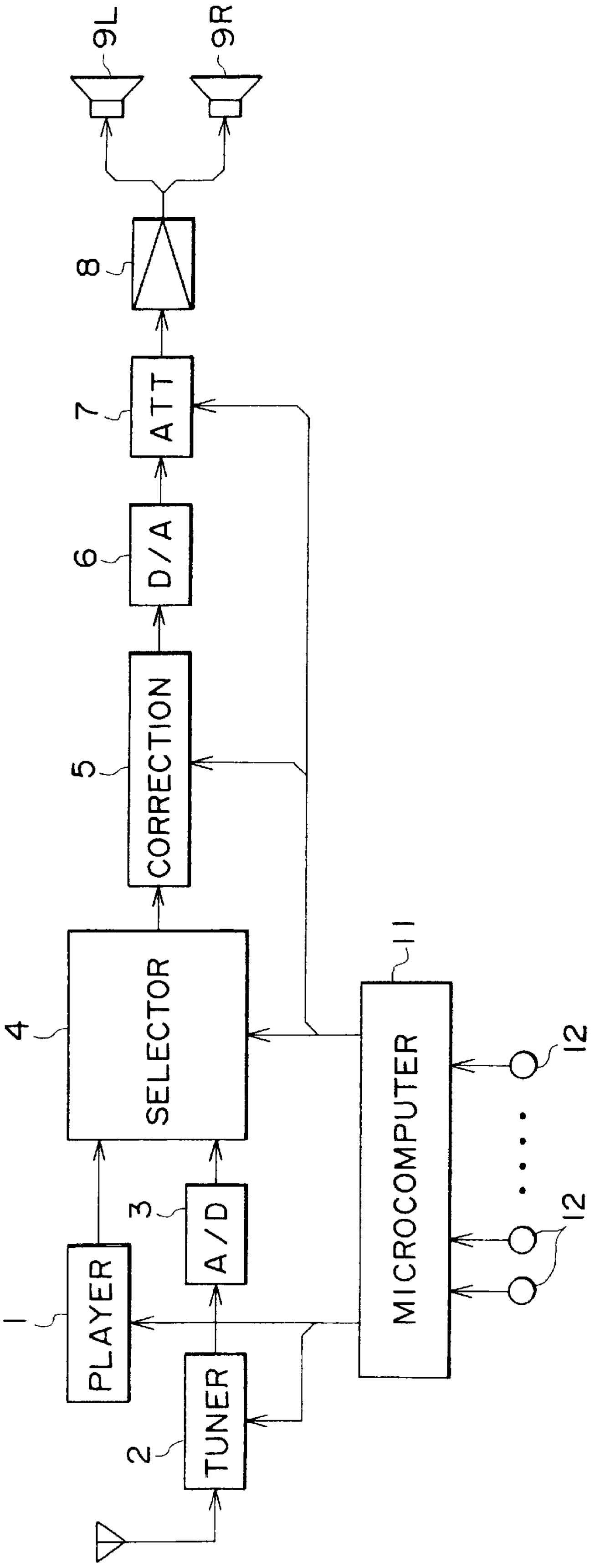
FIG. 1 is a block diagram showing a vehicle-carried sound reproduction apparatus to which the present invention is applied.

FIG. 1 shows a vehicle-carried sound reproduction apparatus to which the present invention is applied. Referring to FIG. 1, the vehicle-carried sound reproduction apparatus includes a player 1, for example, for a CD or an MD as a source of digital audio data, and an input selector circuit 4 to which digital audio data outputted from the player 1 is supplied.

Meanwhile, as a source of an analog audio signal, for example, an FM tuner 2 is provided. An analog audio signal outputted from the tuner 2 is supplied to an A/D converter circuit 3, by which it is converted into digital audio data. The digital audio data is supplied to the selector circuit 4.

Figure 2:
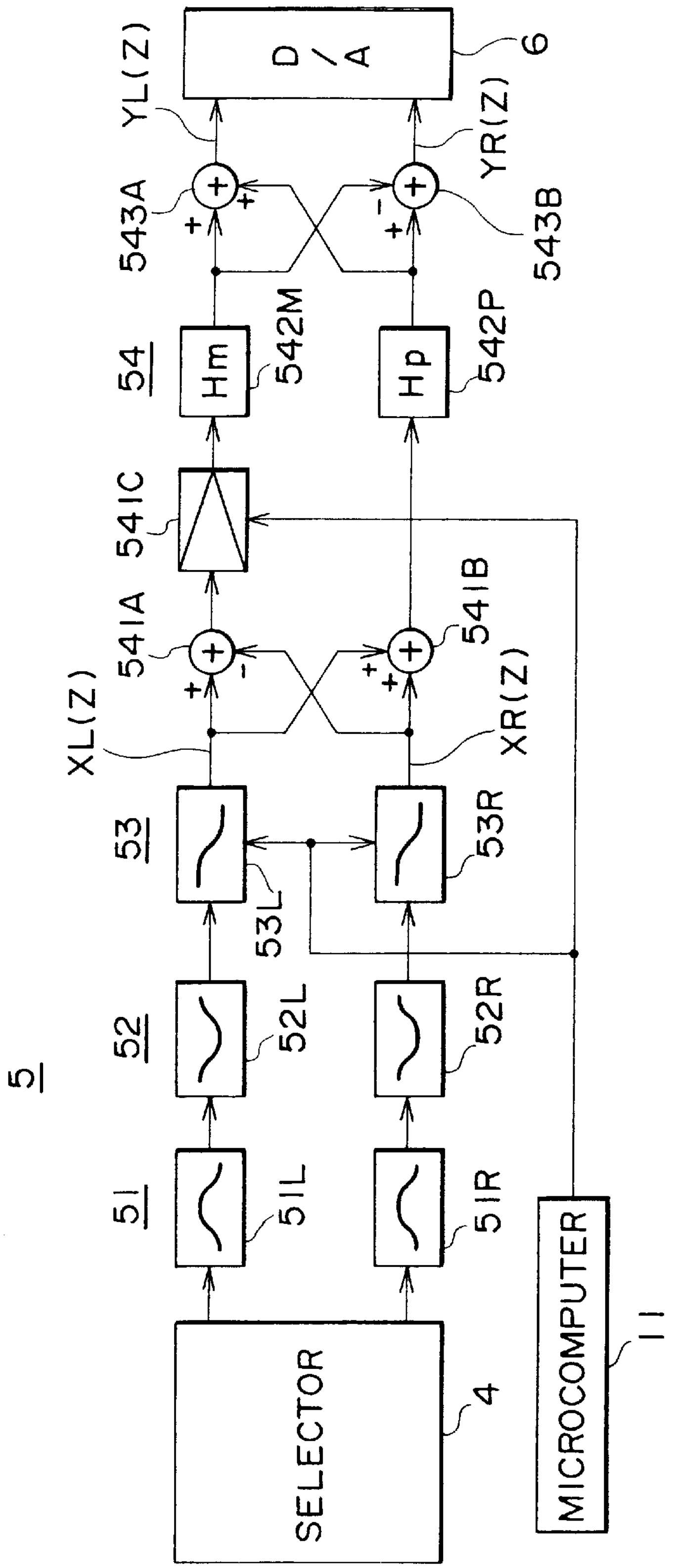
FIG. 2 is a block diagram showing a construction of a digital correction circuit of the vehicle-carried sound reproduction apparatus of FIG. 1.

The selector circuit 4 selects one of the digital audio data supplied thereto and supplies the selected digital audio data to a digital correction circuit 5, by which predetermined correction processing is performed for the digital audio data. Referring to FIG. 2, the digital correction circuit 5 is formed from a DSP (digital signal processor) including a low frequency region correction circuit 51, a resonance reducing circuit 52, a correction amount adjusting circuit 53, and a correction filter circuit 54 and corrects the digital audio data so that a sound image reproduced by a speaker system may be positioned at an aimed position.

Referring back to FIG. 1, the corrected digital audio data is supplied to a D/A converter circuit 6, by which it is converted into an analog audio signal. The analog audio signal is supplied through an attenuator circuit 7 for sound volume adjustment and an output amplifier 8 to a pair of speakers 9L and 9R for the left and right channels.

Figure 9A:
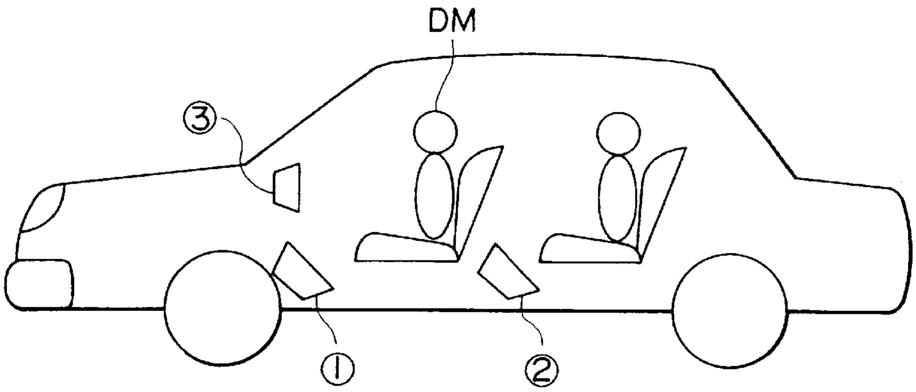
FIGS. 9A and 9B are schematic views illustrating production of a sound field in a vehicle chamber.

The speakers 9L and 9R are disposed or can be disposed, for example, at the positions ① shown in FIG. 9A. In particular, if the vehicle-carried sound reproduction apparatus is provided for a listener on a front seat, then the speakers 9L and 9R are disposed at lower portions of the front doors on the left and right sides of a vehicle, respectively.

The vehicle-carried sound reproduction apparatus further includes a microcomputer 11 for system control. If one of a plurality of operation keys 12 is operated, then the player 1, tuner 2, input selector circuit 4 or attenuator circuit 7 is controlled by the microcomputer 11 in response to the key operation so that the source or the sound volume is varied.

Accordingly, reproduction sound of a CD, an MD or a broadcast is outputted from the speakers 9L and 9R. At this time, a sound image formed by the reproduction sound is positioned, for example, at the height of the eyes of the listener as a result of correction processing of the digital correction circuit 5 even if the speakers 9L and 9R are positioned at the positions ① shown in FIG. 9A.

Measuring Method of the Head Transfer Function

The digital correction circuit 5 corrects digital audio data so that a sound image may be positioned at the height of the eyes of the listener as described above. The correction is realized by use of a transfer function determined taking also an auditory sense characteristic from the speakers to the drums of the listener into consideration, that is, a head transfer function (HTRF).

The head transfer function can generally be measured in the following manner. In particular:

(a) Speakers and a dummy head having a shape of the head of a human being are placed in position.

(b) An impulse signal which becomes flat on a frequency axis when it is Fourier transformed is inputted as a test signal to the speakers. The test signal may alternatively be another signal having a property of an impulse function such as a time stretched pulse signal.

(c) An impulse response of an artificial ear of the dummy head is measured. The impulse response is the head transfer function when the speakers and the dummy head have the positional relationship of the paragraph (a) above.

Accordingly, in order to utilize a head transfer function in the apparatus of FIGS. 1 and 2:

(A) A dummy head DM having a shape of the head of a human being is disposed on a front seat of a standard vehicle or a representative vehicle as shown in FIG. 9A.

(B) Speakers are disposed at actual speaker positions, for example, at the positions ①, and head transfer functions when the speakers are positioned at the positions ① are determined.

(C) A speaker is disposed at which an ideal sound field is to be realized, for example, at the position ③, that is, on the dashboard, and a head transfer function when the speaker is positioned at the position ③ is determined.

Correction Filter Circuit (Part 1) for the Sound Image Position

The position of a sound image is corrected by the digital correction circuit 5 in such a manner as described above, and in the digital correction circuit 5 of FIG. 2, the correction filter circuit 54 executes the correction.

In this instance, the correction filter circuit 54 corrects digital audio data in accordance with the head transfer functions determined in (B) and (C) above. By the data correction, the position of a sound image by the speakers 9L and 9R mounted at the positions ① of the doors adjacent the front seats is corrected to the position of the sound image by the speaker which is positioned at the ideal position ③.

Figure 3A:
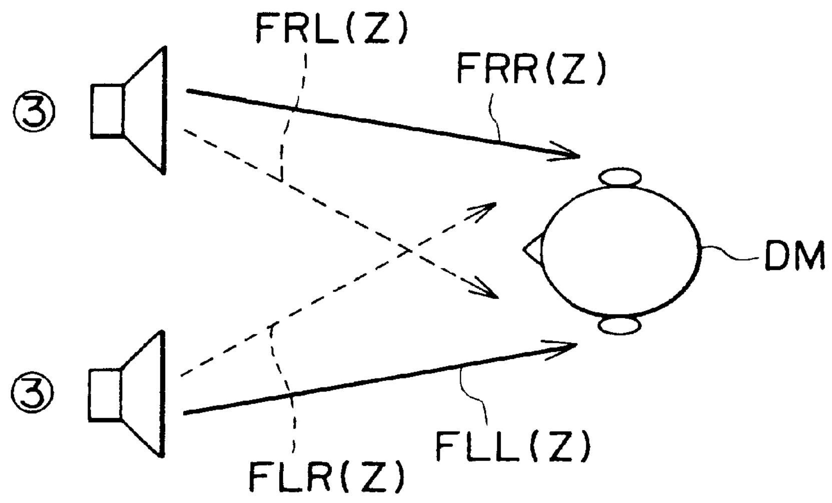
FIGS. 3A and 3B are schematic plan views illustrating operation of the vehicle-carried sound reproduction apparatus of FIG. 1.
Figure 3B:
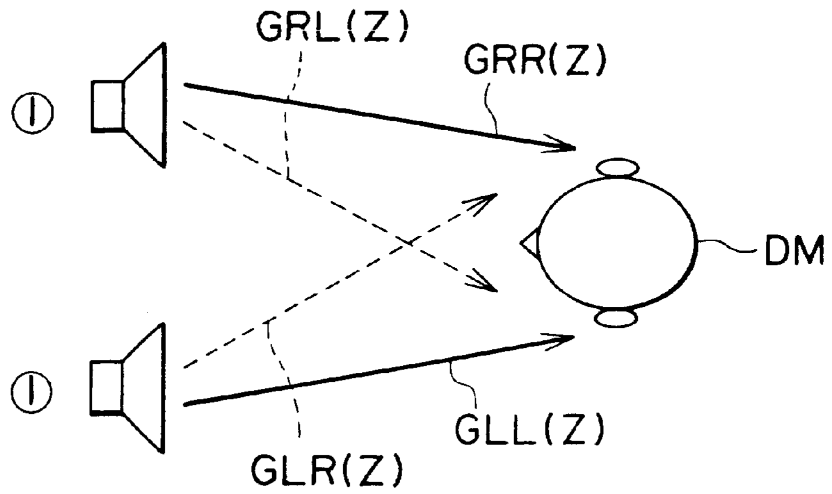

First, it is assumed that head transfer functions HTRF obtained by the measurement and analysis by the steps of the paragraphs (A) to (C) above are such as given below and as illustrated also in FIGS. 3A and 3B:

FLL(Z): head transfer function HTRF from the speaker for the left channel at the position ③ to the left ear FLR(Z): head transfer function HTRF from the speaker for the left channel at the position ③ to the right ear FRL(Z): head transfer function HTRF from the speaker for the right channel at the position ③ to the left ear FRR(Z): head transfer function HTRF from the speaker for the right channel at the position ③ to the right ear GLL(Z): head transfer function HTRF from the speaker for the left channel at the position ① to the left ear GLR(Z): head transfer function HTRF from the speaker for the left channel at the position ① to the right ear GRL(Z): head transfer function HTRF from the speaker for the right channel at the position ① to the left ear GRR(Z): head transfer function HTRF from the speaker for the right channel at the position ① to the right ear It is to be noted that, as described hereinabove, the position ③ is the position of a speaker for realizing an ideal sound field or sound image, and the position ① is the position of the speaker 9L or 9R disposed actually. Further, each of the head transfer functions is presented in a complex number.

Further, input audio signals are defined by parameters XL(Z), XR(Z), YL(Z) and YR(Z) as follows:

XL(Z): input audio signal of the left channel (audio signal before correction)

XR(Z): input audio signal of the right channel (audio signal before correction)

YL(Z): output audio signal of the left channel (audio signal after correction)

YR(Z): output audio signal of the right channel (audio signal after correction)

In order to reduce the amount of data to be processed by the correction filter circuit 54, it is assumed that the head transfer functions above are "leftwardly and rightwardly symmetrical" with each other and the relationships of $$FLL(Z)=FRR(Z) \tag{1}$$

$$FLR(Z)=FRL(Z) \tag{2}$$

$$GLL(Z)=GRR(Z) \tag{3}$$

$$GLR(Z)=GRL(Z) \tag{4}$$

are satisfied to construct the correction filter circuit 54.

Therefore, the location of the dummy head DM when a head transfer function is measured preferably is a central position of the front seats in the vehicle chamber or a central position in the vehicle chamber. Where the dummy head DM is located in this manner, the correction difference between different seats is minimized and a correction effect can be anticipated at any seat.

In order to make correction under the assumptions of the expressions (1) to (4) so that sound comes out from a speaker at the position ③, the following expressions (5) and (6) should be satisfied. In particular, $$YL(Z)\cdot GLL(Z)+YR(Z)\cdot GLR(Z)=XL(Z)\cdot FLL(Z)+XR(Z)\cdot FLR(Z) \tag{5}$$

$$YR(Z)\cdot GLL(Z)+YL(Z)\cdot GLR(Z)=XR(Z)\cdot FLL(Z)+XL(Z)\cdot FLR(Z) \tag{6}$$

Here, if Hp(Z) and Hm(Z) are defined as $$Hp(Z)=(FLL(Z)+FLR(Z))/(GLL(Z)+GLR(Z)) \tag{7}$$

$$Hm(Z)=(FLL(Z)-FLR(Z))/(GLL(Z)-GLR(Z)) \tag{8}$$

then YL(Z) and YR(Z) are represented as $$YL(Z)=Hp(Z)\cdot(XL(Z)+XR(Z))/2\ +Hm(Z)\cdot(XL(Z)-XR(Z))/2 \tag{9}$$

$$YR(Z)=Hp(Z)\cdot(XL(Z)+XR(Z))/2\ -Hm(Z)\cdot(XL(Z)-XR(Z))/2 \tag{10}$$

It is also known that a difference component between stereo music signals has much influence upon a stereo feeling and a feeling of expansion. The second terms in the expressions (9) and (10) represent difference components of stereo signals. Accordingly, if the levels of the second terms are controlled, then the feeling of spatial expansion can be controlled.

Here, if the second terms of the expressions (9) and (10) are multiplied by a coefficient k as a parameter for controlling the feeling of expansion, then the expressions (9) and (10) can be deformed respectively as $$YL(Z)=Hp(Z)\cdot(XL(Z)+XR(Z))/2+k\cdot Hm(Z)\cdot(XL(Z)-XR(Z))/2 \quad (11)$$

$$YR(Z)=Hp(Z)\cdot(XL(Z)+XR(Z))/2k\cdot Hm(Z)\cdot(XL(Z)-XR(Z))/2 \quad (12)$$

In the expressions (11) and (12), if the coefficient k increases, then the different components of the second terms are emphasized, and accordingly, the feeling of expansion of the reproduction sound field is promoted.

Thus, according to the expressions (11) and (12), the correction filter circuit 54 can be formed from a filter having characteristics represented by the expressions (7) and (8), an addition circuit and a subtraction circuit, and a level control circuit.

The correction filter circuit 54 shown in FIG. 2 is constructed based on the concept just described. In this instance, digital audio data from the correction amount adjusting circuit 53 are used as the input signals XL(Z) and XR(Z) to the correction filter circuit 54, and the output signals of the correction filter circuit 54 are the signals YL(Z) and YR(Z)

In particular, the input signals XL(Z) and XR(Z) are inputted to a subtraction circuit 541A and an addition circuit 541B, by which a difference signal and a sum signal are formed, respectively. The difference signal is supplied to a level control circuit 541C, by which level control corresponding to the coefficient k in the expressions (11) and (12) is performed for the difference signal, and the resulting difference signal is supplied to a filter circuit 542M. Meanwhile, the sum signal is supplied to a filter circuit 542P. The filter circuits 542M and 542P are each formed from a FIR filter and have transfer characteristics represented by the expressions (8) and (7) given hereinabove, respectively.

Output signals of the filter circuits 542M and 542P are supplied at predetermined ratios to a addition circuit 543A and a subtraction circuit 543B, by which output signals YL(Z) and YR(Z) are formed, respectively.

The signals YL(Z) and YR(Z) are supplied to the D/A converter circuit 6 in the next stage.

Accordingly, even if the speakers 9L and 9R are mounted at the positions ① on the doors adjacent the front seats, a sound image equivalent to that produced when the speakers 9L and 9R are disposed at the ideal position ③ can be regenerated. Further, since the level control circuit 541C controls the coefficient k under the control of the microcomputer 11, also it is possible to emphasize the feeling of expansion.

Simplification of the Correction Filter Circuit 54

Figure 4:
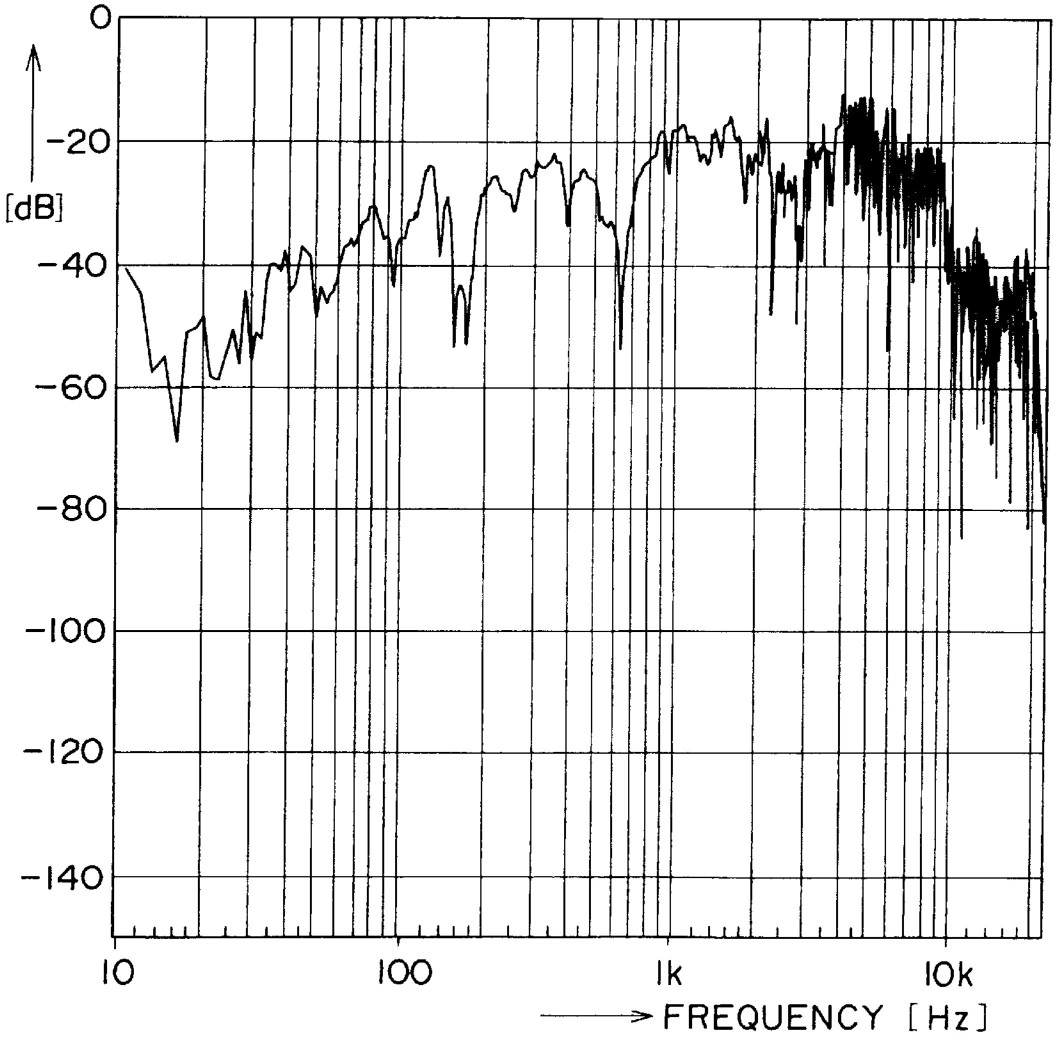
FIG. 4 is a diagram illustrating a characteristic of the vehicle-carried sound reproduction apparatus of FIG. 1.

FIG. 4 illustrates an example of measurement of the impulse response and represents a result of measurement of the impulse response from the speaker disposed at the position ① of the left door adjacent a front seat of the vehicle to the left ear of the dummy head DM disposed at the center of the front seats.

As can be seen from the result of the measurement, a great peak or dip appears in the impulse response. If such peak or dip is used at it is by the correction filter circuit 54, then a comparatively greater order number is required for the filter circuits 542M and 542P, and large scale processing is required.

Therefore, in the following, a method of simplifying the filter circuits 542M and 542P to simplify the correction filter circuit 54 is described.

(a) Smoothing on the Frequency Axis

Figure 5:
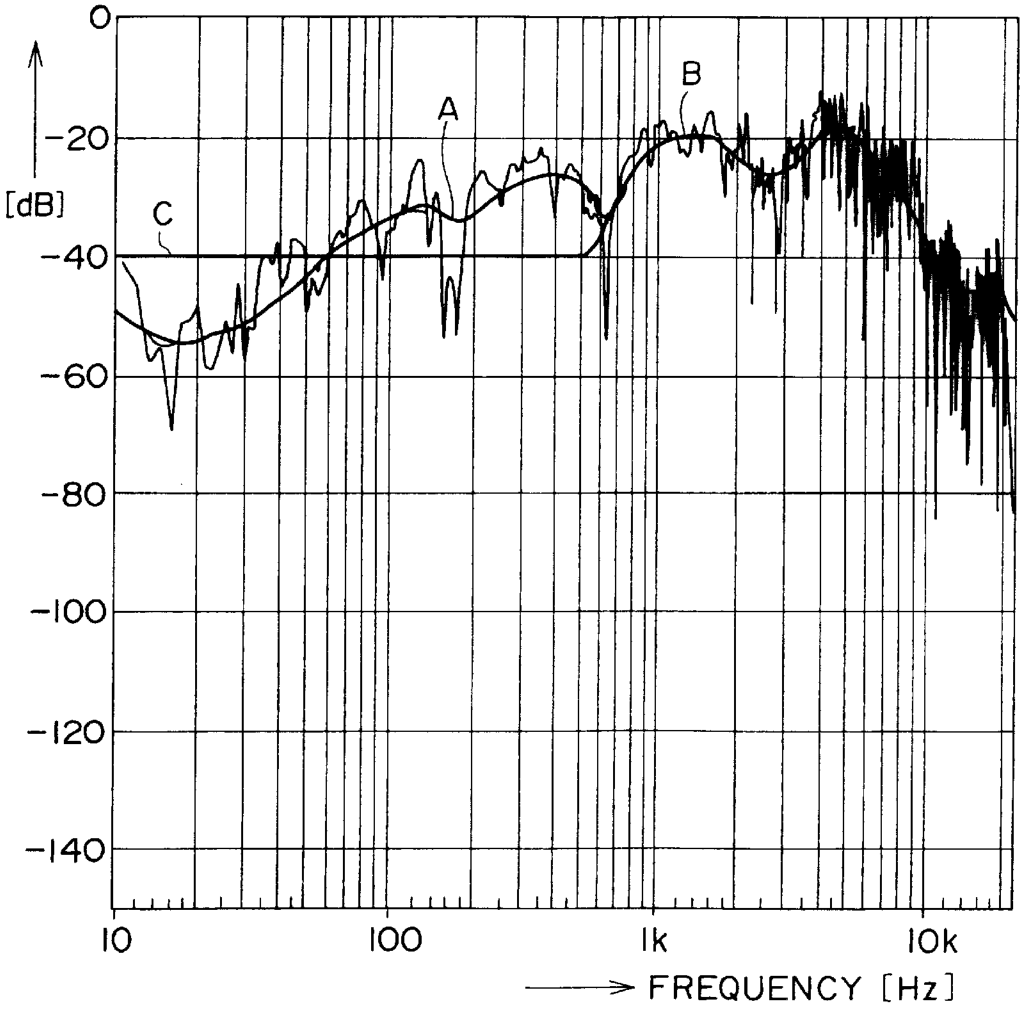
FIG. 5 is a similar view but illustrating a smoothed characteristic of the characteristic illustrated in FIG. 4.

For example, the amplitude of the result of the measurement of FIG. 4 is smoothed on the frequency axis to remove steep peaks and dips to utilize a general tendency of the impulse response. For example, by smoothing the amplitude of the result of the measurement shown in FIG. 4, characteristics of curves A and B of FIG. 5 are obtained, and the filter circuits 542M and 542P are constructed in accordance with the characteristics of the curves A and B.

(b) Smoothing of Data

Figure 6:
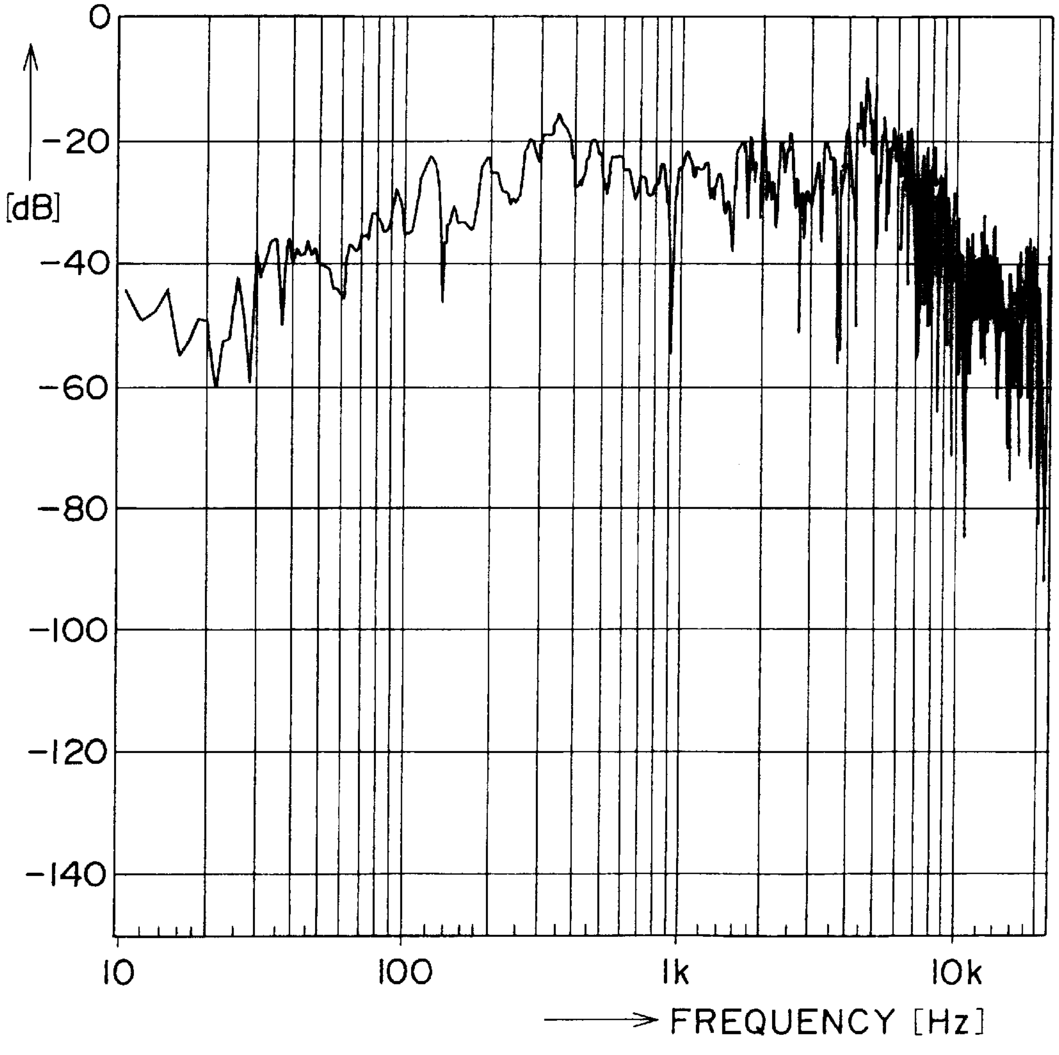
FIGS. 6 and 7 are similar views but illustrating different characteristics of the vehicle-carried sound reproduction apparatus of FIG. 1.
Figure 7:
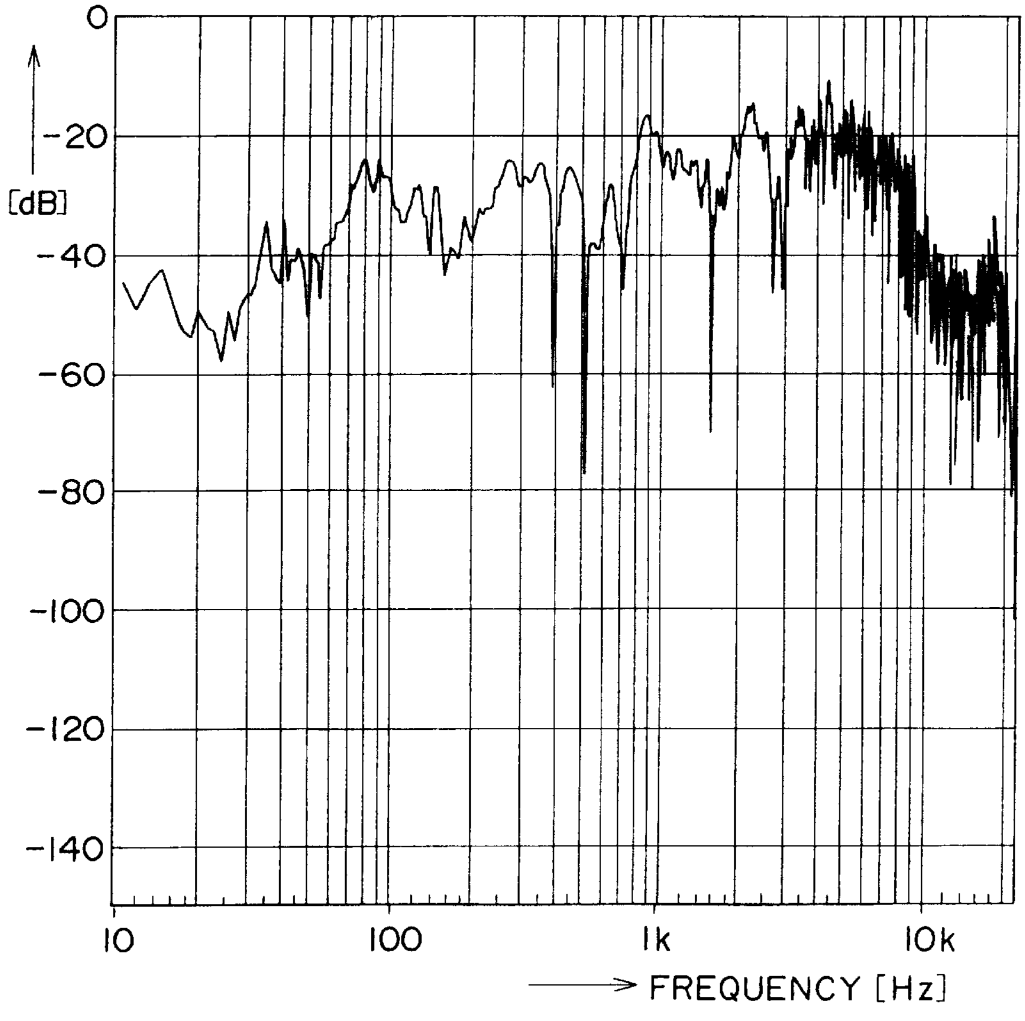

FIGS. 6 and 7 show different examples of a result of measurement of the impulse response. Particularly, FIG. 6 shows a result of a measurement of the impulse response from the speaker disposed at the position ① of the door adjacent the front left seat of the vehicle to the left ear of the dummy head DM disposed on the front left seat. Meanwhile, FIG. 7 shows a result of a measurement of the impulse response from the speaker disposed at the position ① of the door adjacent the front left seat of the vehicle to the left ear of the dummy head DM disposed on the front right seat.

As can be seen from the measurement results of FIGS. 6 and 7 and the measurement result of FIG. 4, in a frequency band 1 kHz or lower, generally there is a tendency that the amplitude characteristic is much different depending upon the location of measurement in the vehicle chamber. This arises from an influence of resonance (standing waves) in the vehicle chamber because the vehicle chamber is a closed space. Accordingly, correction of such low frequency components restricts the listening position. Further, in order to correct the low frequency components, the order number of the filters must be sufficiently great.

Therefore, correction is not performed for the frequency band 1 kHz or lower. In other words, as indicated by a straight line C in FIG. 5, the amplitude of the response in the frequency band 1 kHz or lower is flattened with an average level thereof. Then, the filter circuits 542M and 542P are constructed in accordance with the characteristics of the straight line C and the curve B.

(c) Phase Minimization

As a method of reducing the order number of a filter, a technique called phase minimization is available.

Thus, when calculation of the expressions (7) and (8) is performed, phase minimization is performed for each of calculations of the numerator and the denominator first, and then division is performed to reduce the order number of the filter circuits 542M and 542P.

When calculation of the expressions (7) and (8) is performed, if phase minimization is performed for a result of division of the numerator/denominator, then the order number of the filter circuits 542M and 542P can be further reduced.

However, according to an experiment, a better result of correction for a sound image was obtained when division was performed after phase minimization was performed for each of calculations of the numerator and the denominator than when phase minimization was performed for a result of the division of the numerator/denominator.

By performing the operations (a) to (c) described above, the order number of the filter circuits 542M and 542P can be reduced, and as a result, the correction filter circuit 54 can be simplified.

Correction of Low Frequency Components

Generally, there is a tendency that, if such correction of a sound image position as described above is performed, then the high frequency level rises. Therefore, the digital correction circuit 5 includes the low frequency region correction circuit 51 so that balance correction of output sound may be performed.

In particular, the low frequency region correction circuit 51 includes a pair of band reinforcement filters 51L and 5IR interposed in signal lines for digital audio data (the signals XL(Z) and XR(Z)).

It is to be noted that the band reinforcement filters 51L and 5IR have, for example, such characteristics as center frequency: 20 Hz to 120 Hz, amount of boost of the frequency characteristic (signal level) at the center frequency: 2 dB to 18 dB, and Q at the center frequency: 1 to 3

Reduction of the Influence of Resonance (Standing Waves) in the Vehicle Chamber

The inside of the vehicle chamber is a closed space having a complicated configuration. In a closed space, a "vehicle chamber resonance phenomenon" wherein standing waves are formed resonating with sound outputted from a speaker occurs.

According to an investigation, the frequency at which the influence of the vehicle chamber resonance phenomenon appeared most significantly was generally a frequency band 800 Hz or lower. Accordingly, if the output level of sound in the frequency band of 100 Hz to 800 Hz is dropped, then the "confined feeling" can be reduced without having much influence on the quality feeling of a music signal.

Thus, the digital correction circuit 5 of FIG. 2 includes the resonance reducing circuit 52 in order to reduce resonance. In particular, the resonance reducing circuit 52 includes a pair of band attenuation filters 52L and 52R interposed in the signal lines for digital audio data (the signals XL(Z) and XR(Z)).

The band attenuation filters 52L and 52R have, for example, such characteristics as center frequency: 150 Hz to 600 Hz, attenuation amount of the frequency characteristic (signal level) at the center frequency: 3 dB to 6 dB, and Q at the center frequency: 2 to 4

Adjustment of the Effect Associated with Sound Volume Adjustment

It is described hereinabove that there is a tendency that, if the correction of the sound image position described above is performed, then the high frequency level rises. As a result, a problem occurs that, when the sound volume is made great, sound in a high frequency region rings in the listener's ear.

Therefore, the digital correction circuit 5 includes the correction amount adjusting circuit 53 so that sound in a high frequency region when the sound volume is great may be suppressed. In particular, the correction amount adjusting circuit 53 includes a pair of high frequency attenuation filters (shelving filters) 53L and 53R interposed in the signal lines for digital audio data (the signals XL(Z) and XR(Z)).

The high frequency attenuation filters 53L and 53R have, for example, such characteristics as order number: 1, turnover frequency: 1 kHz to 10 kHz, and attenuation amount of the frequency characteristic (signal level) in the high frequency region: 0 dB to 20 dB.

If one of the operation keys 12 which is for sound volume adjustment is operated, then the attenuation amount of the attenuator circuit 7 is controlled by the microcomputer 11 so that the sound volume of reproduction sound is adjusted. In this instance, the attenuation amounts of the high frequency attenuation filters 53L and 53R in the high frequency region are controlled simultaneously by the microcomputer 11 so that, as the sound volume increases, the attenuation amounts of the high frequency attenuation filters 53L and 53R in the high frequency region increase.

Accordingly, in any sound volume, appropriate reproduction can be performed and also control therefor can be performed readily.

Control of the Feeling of Expansion

Since a difference component of the left and right channels of a music signal have significant influence on the stereo feeling and the feeling of expansion as described hereinabove, the digital correction circuit 5 of FIG. 2 includes the level control circuit 541C.

The level control circuit 541C controls the level of a difference component to be supplied from the subtraction circuit 541A to the filter circuit 542M in accordance with the coefficient k in response to an instruction from the microcomputer 11. Accordingly, the feeling of spatial expansion of reproduction sound can be emphasized.

However, if the level of the difference component is increased to emphasize the feeling of expansion, then the sound generally sounds as if the sound volume had increased. Therefore, in the reproduction apparatus of FIG. 1, when the level of the reference component is controlled by the level control circuit 541C, simultaneously the level of the audio signal is corrected by the attenuator circuit 7 for sound volume adjustment, and consequently, the sound volume of reproduction sound is corrected.

Accordingly, with the reproduction apparatus of FIG. 1, the position of the sound image is corrected to the height of the eyes and a sound field which provides a sufficient feeling of expansion is regenerated.

As described above, with the vehicle-carried sound reproduction apparatus of FIG. 1 and FIG. 2, since it is possible for a listener to perceive that reproduction sound is outputted from an imaginary speaker which is imaginarily disposed at a location at which a speaker cannot originally be disposed, an ideal sound field and image can be produced in the vehicle chamber.

Accordingly, it is possible to prevent a sound image from being positioned at a low place and cause the sound image to be positioned at the height of the eyes of the listener which is an ideal position. Further, the disadvantage which encounters where an additional small speaker for reproduction of sound in a high frequency region is disposed at a comparatively high position, that is, the disadvantage that sounds sound separately to the ears of the listener, can be eliminated, and it is possible for the listener to perceive that sound is outputted out from a single speaker.

Further, the feeling of spatial expansion of a sound field can be corrected by controlling the level of the difference component. Furthermore, optimum correction can be performed in accordance with the sound volume level. Besides, the digital correction circuit 5 can be simplified, and even where a DSP having a comparatively low processing capability is used for the digital correction circuit 5, an anticipated object can be achieved. Further, only if a transfer function is measured, optimum correction can be performed with any model of a vehicle having any configuration.

Further, by averaging a plurality of transfer functions, a correction filter circuit which can be effectively used for a plurality of different models of vehicles can be produced. Accordingly, the correction filter circuit can be universally used as a correction filter circuit whose application is not limited to a specific model of a vehicle.

Further, sound in a low frequency region is outputted with intensified power from the speakers for both of the front seats and the rear seats of the vehicle.

Since generally the speakers on the rear seat side in most cases have a greater diameter, the performance of the speakers in the vehicle chamber can be exhibited sufficiently with regard to the output for sound in a low frequency region.

Correction Filter Circuit for the Sound Image Position (Part 2)

Generally, it is considered ideal to dispose the left and right speakers for stereo reproduction at leftwardly and rightwardly symmetrical positions as viewed from the listener, and it is considered ideal that a sound image regenerated by the speakers is positioned in front of the listener.

Figure 9B:
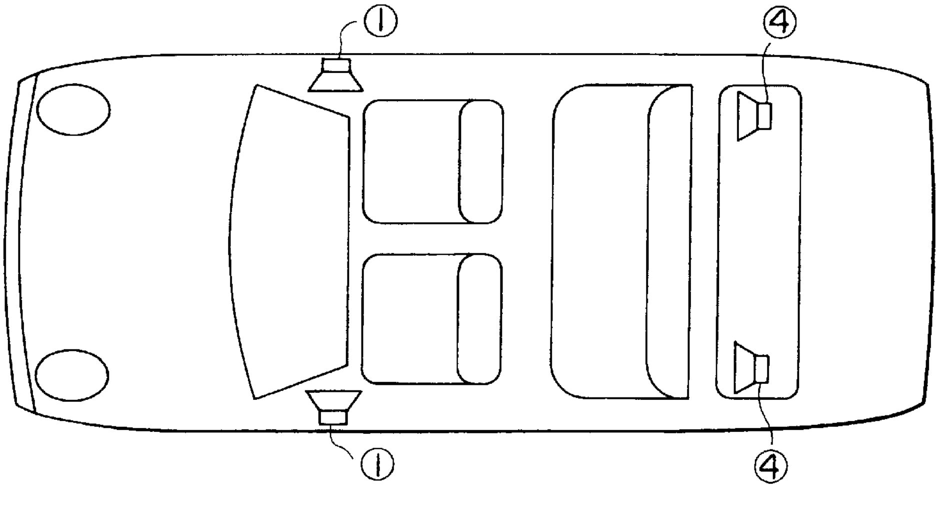

However, in a vehicle-carried sound reproduction apparatus, speakers for the front seats are in most cases disposed at lower positions ① of the front doors and speakers for the rear seats are in most cases disposed at lower positions ② of the rear doors as described hereinabove with reference to FIG. 9A, or speakers for rear doors are frequently disposed at positions ④ of a rear tray as shown in FIG. 9B.

Therefore, for example, at a passenger on the right front seat, a reproduction sound outputted from the speaker disposed on the right front side arrives first, and then reproduction sounds outputted from the other speakers successively arrive after some delays of time. Accordingly, the passenger hears the reproduction sounds having phases displaced from one another. As a result, a feeling of a clearly positioned sound image cannot be obtained.

Thus, a method has been proposed wherein the phases of audio signals to be supplied to different speakers are corrected by delay circuits so that reproduction sounds outputted from the different speakers may arrive in the same phase at a passenger. However, even with the method, the position of a sound image perceived by a passenger on a front seat is displaced rearwardly by high frequency components of reproduction sounds outputted from the speakers at the rear positions (② or ④. As a result, a sound image clearly positioned in front of the listener cannot be obtained.

On the other hand, if the output power of the speakers disposed at the rear positions ② or ④ is lowered, then a sound image can be positioned in front of the listener effectively. However, this decreases the overall sound pressure level.

Figure 8:
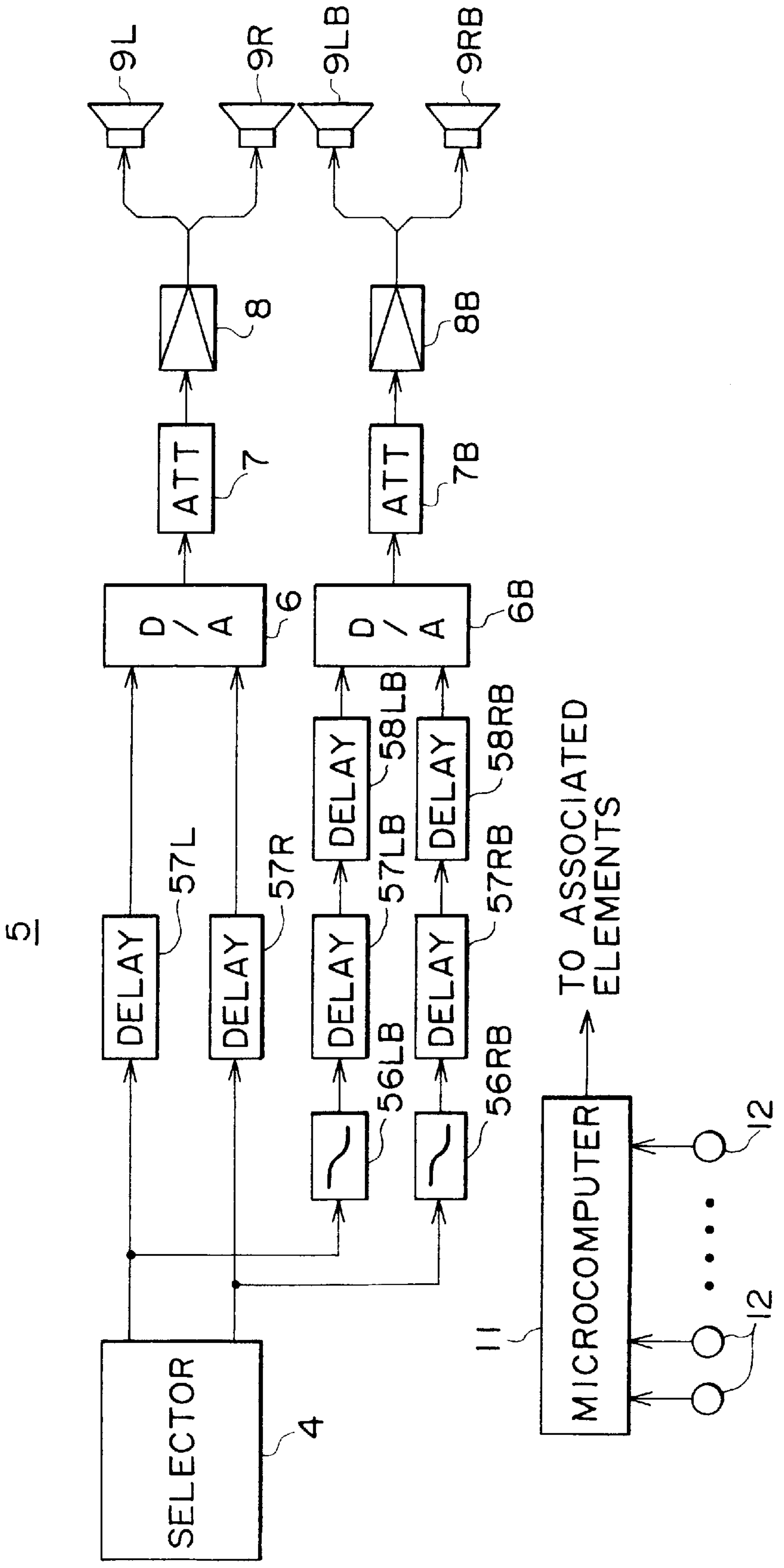
FIG. 8 is a block diagram showing another construction of the digital correction circuit of the vehicle-carried sound production apparatus of FIG. 1.

Therefore, in another form of the digital correction circuit 5 shown in FIG. 8, the processing of correcting the height of a sound image to be reproduced to the height of the eyes of a passenger is omitted to simplify the circuit construction while a sound characteristic at a seated position of the passenger is augmented.

Referring to FIG. 8, in the digital correction circuit 5 shown, digital audio data selected by a selector circuit 4 are supplied to a pair of delay circuits 57L and 57R, by which they are delayed by predetermined times. The thus delayed digital audio data are supplied to a D/A converter circuit 6, by which they are converted into analog audio signals. The audio signals are supplied to a pair of speakers 9L and 9R for the left and right channels through an attenuator circuit 7 for sound volume adjustment and an output amplifier 8. The speakers 9L and 9R are disposed, for example, at the positions ① described hereinabove with reference to FIGS. 9A and 9B.

Further, the digital audio data selected by the input selector circuit 4 are supplied to a pair of high frequency attenuation filters (shelving filters) 56LB and 56RB. The high frequency attenuation filters 56LB and 56RB are provided to attenuate high frequency components, which act to displace a sound image rearwardly as described hereinabove, and have, for example, the following characteristics:

order number: 1 turnover frequency: 1 kHz to 10 kHz attenuation amount of the frequency characteristic (signal level) in the high frequency region: 2 dB to 10 dB The digital audio data outputted from the high frequency attenuation filters 56LB and 56RB are supplied to a pair of delay circuits 57LB and 57RB, by which they are delayed by predetermined times. Then, the delayed digital audio data are supplied through a pair of the delay circuits 58L and 58R to a D/A converter 6B, by which they are converted into analog audio signals. The audio signals are supplied a pair of speakers 9LB and 9RB for the left and right channels through an attenuator circuit 7B for sound volume adjustment and an output amplifier 8B. It is to be noted that the speakers 9LB and 9RB are disposed, for example, at the positions ② of FIG. 9A or the positions ④ of FIG. 9B.

In this instance, the high frequency attenuation filters 56LB and 56RB attenuate high frequency components which displace the sound image rearwardly as described above, but output low frequency components, which do not relate much to the positioning of the sound image, as they are. Further, the delay circuits 57L, 57R, 57LB and 57RB are provided to adjust the phases of reproduction sounds to be outputted from the speakers 9L, 9R, 9LB and 9RB in accordance with the seated position of a passenger.

Therefore, if one of the operation keys 12 which is provided to input a seated position is operated, then the attenuation amounts of sound in a high frequency region of the high frequency attenuation filters 56LB and 56RB and the delay times of the delay circuits 57L, 57R, 57LB and 57RB are controlled by the microcomputer 11 in response to the operation of the key.

The delay circuits 58LB and 58RB are provided to cause reproduction sounds outputted from the speakers 9L and 9R at the forward positions to arrive at a passenger seated on a front seat relatively earlier by 10 msec to 20 msec than reproduction sounds outputted from the speakers 9LB and 9RB at the rearward positions.

With the digital correction circuit 5 having the construction described above, the phases when reproduction sounds outputted from the speakers 9L, 9R, 9LB and 9RB arrive at a passenger can be adjusted by the delay circuits 57L to 57RB, and accordingly, a sound image can be positioned definitely.

Further, since high frequency components of reproduction sounds to be outputted from the speakers 9LE and 9RB are attenuated by the high frequency attenuation filters 56LB and 56RB, respectively, the position of a sound image as perceived by a passenger on a front seat is prevented from being displaced rearwardly, and a sound image can be positioned definitely also in this regard.

Furthermore, while the auditory sense of a human being has a preceding sound effect (Haas effect), that is, a characteristic that a sound arriving prior by a time of approximately 10 msec to 20 msec is perceived emphatically, by the delay circuits 58LB and 58RB, since reproduction sounds outputted from the speakers 9L and 9R at the forward positions precede reproduction sounds outputted from the speakers 9LB and 9RB at the rearward positions relatively by approximately 10 msec to 20 msec, the reproduction sounds outputted from the speakers 9L and 9R at the front positions are emphasized. Consequently, a sound image can be positioned forwardly without decreasing the overall sound volume.

Further, since low frequency sounds which do not influence much upon positioning of the sound image are outputted from the speakers 9LB and 9RB, the overall sound pressure level does not drop or the thickness of sound in the low frequency region is not lost. Further, since, in a vehicle-carried audio system, the rear speakers generally have a diameter greater than that of the rear speakers, the performance of the speakers 9LB and 9RB can be exhibited sufficiently for the low frequency outputs.

Furthermore, since reproduction sounds outputted from the speakers 9L and 9R are perceived emphatically due to the preceding sound effect, even where signal processing such as graphic equalizer processing can be set only to signal lines for audio signals to be supplied m to the front speakers 9L and 9R from a restriction of a DSP or the like, the effect acts so as to be effective for the entire vehicle chamber.

Others

While a designing procedure for the filter circuits 542M and 542P is described in the paragraphs (a) to (c) above, the subject and the order of the paragraphs (a) to (c) are not limited to those described hereinabove. Further, where an additional speaker for exclusive use for high frequency sound is disposed on the dashboard or the like, an audio signal to be supplied to the speaker can be obtained effectively if it is processed similarly by a high frequency attenuation filter similar to the high frequency attenuation filters 53L and 53R.

Also it is possible to combine the digital correction circuit 5 of FIG. 2 with the digital correction circuit 5 of FIG. 8. Further, the delay circuits 57LB and 57RB and the delay circuits 58LB and 58RB of the digital correction circuit 5 of FIG. 8 may be integrated with each other, respectively.

Furthermore, while it is described in the foregoing description that a seated position of a passenger is inputted using the operation keys 12, also it is possible to detect a seated position of a passenger by means of an infrared ray sensor provided in the vehicle chamber or a pressure sensor provided for a seat and control the high frequency attenuation filters 56LB and 56RB and the delay circuits 57L to 57RB by means of the microcomputer 11 in accordance with a detection output of the sensor so that they may have characteristics suitable for the seated position.

While a preferred embodiment of the present invention has been described using specific terms, such description is for illustrative purposes only, and it is to be understood that changes and variations may be made without departing from the spirit or scope of the following claims.

What is claimed is:

1. A vehicle-carried sound reproduction apparatus, comprising:

a correction filter circuit for converting input digital audio signals XL(Z) and XR(Z) for left and right channels into digital audio signals YL(Z) and YR(Z) represented, using head transfer functions, respectively by $$YL(Z)\cdot GLL(Z)+YR(Z)\cdot GLR(Z)=XL(Z)\cdot FLL(Z)+XR(Z)\cdot FLR(Z)$$

$$YR(Z)\cdot GLL(Z)+YL(Z)\cdot GLR(Z)=XR(Z)\cdot FLL(Z)+XL(Z)\cdot FLR(Z)$$

where, because the head transfer functions are leftwardly and rightwardly symmetrical with each other, the relationships of FLL(Z)=FRR(Z), FLR(Z)=FRL(Z), GLL(Z)=GRR(Z) and GLR(Z)=GRL(Z) are satisfied, and FLL(Z) is a head transfer function from a first speaker for the left channel positioned forwardly of a listener in a vehicle chamber to the left ear of the listener, FRR(Z) is a head transfer function from a first speaker for the right channel positioned forwardly of the listener to the right ear of the listener, FLR(Z) is a head transfer function from said first speaker for the left channel to the right ear of the listener, FRL(Z) is a head transfer function from said first speaker for the right channel to the left ear of the listener, GLL(Z) is a head transfer function from a second speaker for the left channel positioned at a lower position forwardly of the listener to the left ear of the listener, GRR(Z) is a head transfer function from a second speaker for the right channel positioned at a lower position forwardly of the listener to the right ear of the listener, GLR(Z) is a head transfer function from said second speaker for the left channel to the right ear of the listener, and GRL(Z) is a head transfer function from said second speaker for the right channel to the left ear of the listener; and a digital to analog converter circuit for converting the digital audio signals YL(Z) and YR(Z) outputted from said correction filter circuit into analog audio signals;

the analog audio signals outputted from said digital to analog converter circuit being supplied to said second speakers for the left and right channels.

2. A vehicle-carried sound reproduction apparatus according to claim 1, wherein, where Hp(Z) and Hm(Z) are defined respectively as $$Hp(Z)=(FLL(Z)+FLR(Z))/(GLL(Z)+GLR(Z))$$

$$Hm(Z)=(FLL(Z)-FLR(Z))/(GLL(Z)-GLR(Z)),$$

said correction filter circuit includes a first subtraction circuit for subtracting one from the other of the input digital audio signals XL(Z) and XR(Z) and a first addition circuit for adding the input digital audio signals XL(Z) and XR(Z), first and second digital filters having the transfer characteristics Hm(Z) and Hp(Z), respectively, and a second addition circuit for adding output signals of said first and second digital filters and a second subtraction circuit for subtracting one from the other of the output signals of said first and second digital filters, and a difference signal from said first subtraction circuit and a sum signal from said first addition circuit are supplied to said first and second digital filters whereas output signals of said second addition circuit and said subtraction circuit are supplied to said digital to analog converter.

3. A vehicle-carried sound reproduction apparatus according to claim 2, further comprising a high frequency attenuation filter provided in a preceding stage to said correction filter circuit and having an attenuation amount in a high frequency region which varies in accordance with sound volume control.

4. A vehicle-carried sound reproduction apparatus according to claim 3, further comprising a band reinforcement filter having a center frequency of 20 Hz to 200 Hz and a band attenuation filter having a center frequency of 150 Hz to 600 Hz, said band reinforcement filter and said band attenuation filter being disposed in a stage preceding to said correction filter circuit.

5. A vehicle-carried sound reproduction apparatus according to claim 4, further comprising a level control circuit for controlling a level of the difference signal to be supplied from said subtraction circuit to said first digital filter.

6. A vehicle-carried sound reproduction apparatus, comprising:

a pair of first signal lines along which a pair of digital audio signals for left and right channels are supplied;

a pair of second signal lines along which the digital audio signals for the left and right channels are supplied;

first and second delay circuits provided in said first signal lines for providing predetermined time delays to the digital audio signals for the left and right channels supplied along said first signal lines;

third and fourth delay circuits provided in said second signal lines for providing predetermined time delays to the digital audio signals for the left and right channels supplied along said second signal lines;

a pair of high frequency attenuation filters provided for said second signal lines for attenuating high frequency components of the digital audio signals for the left and right channels supplied along said second signal lines;

fifth and sixth delay circuits provided for said second signal lines for providing time delays corresponding to a preceding sound effect to the digital audio signals for the left and right channels supplied along said second signal lines;

a first digital to analog converter circuit for converting the digital audio signals for the left and right channels outputted from said first signal lines into analog audio signals;

a second digital to analog converter circuit for converting the digital audio signals for the left and right channels outputted from said second signal lines into analog audio signals;

a first pair of speakers disposed at left and right positions forwardly in a vehicle chamber for receiving the analog audio signals outputted from said first digital to analog converter circuit to reproduce sound;

a second pair of speakers disposed at left and right positions rearwardly in the vehicle chamber for receiving the analog audio signals outputted from said second digital to analog converter circuit to reproduce sound; and means for controlling the delay times of said first to fourth delay circuits in response to a positional relationship between said first and second pairs of speakers and a listener.

7. A vehicle-carried sound reproduction apparatus according to claim 6, wherein said first to fourth delay circuits, said high frequency attenuation filter and said fifth and sixth delay circuits are formed as a single digital signal processor.

* * * * *